Inventors
Alfred H. Lakeman
Leslie A. Gale

Patented Mar. 8, 1938

2,110,228

UNITED STATES PATENT OFFICE 2,110,228

PRINTING MACHINE

Alfred Harry Lakeman and Leslie Augustus Gale, London, England; said Gale assignor to said Lakeman Application December 21, 1936, Serial No. 117,089
In Great Britain December 23, 1935

13 Claims. (Cl. 101—288)

The object of the invention is to enable a paper web to be fed intermittently to and delivered from a platen printing press. It is an object of the invention to enable a paper web to be fed intermittently across the platen of a platen printing press of the kind in which there is a clear passage for the web at the sides of the machine, for example, in a press in which the platen is moved to and from the printing bed by means of toggle mechanism connected to a depending part of the platen.

The invention is particularly applicable to the printing of webs which are folded or re-reeled for use in the known continuous manifold system of typing invoices, delivery notes and the like, and in order to allow for the different sizes of such invoices or the like, the means for intermittently feeding the web over the platen is adjustable, that is to say, its stroke can be varied or regulated so that the required length of web per operation can be adjusted to suit an invoice or the like of the required size.

One form of the invention is shown by way of example in the accompanying drawings, applied to a platen printing press of the well-known Heidelberg type.

Figure 1:
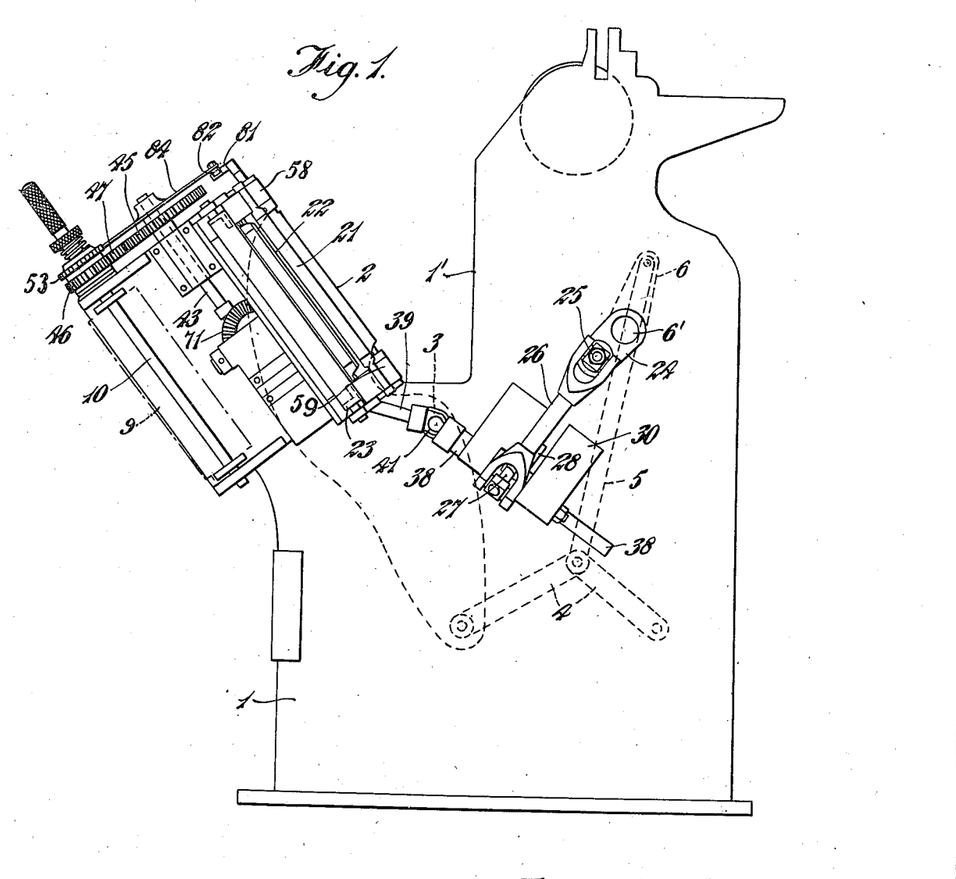
Figure 1 is a diagrammatic side elevation of the press with the invention applied, the inking arrangement and normal sheet feeding and delivering apparatus being omitted.
Figure 3:
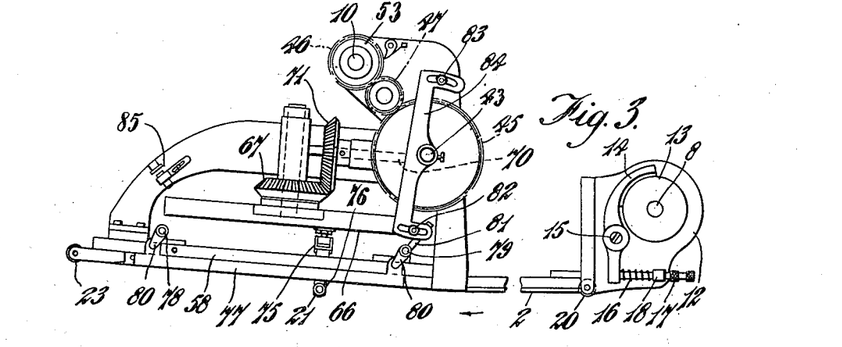
Figure 3 being a plan view corresponding thereto.
Figure 3A:
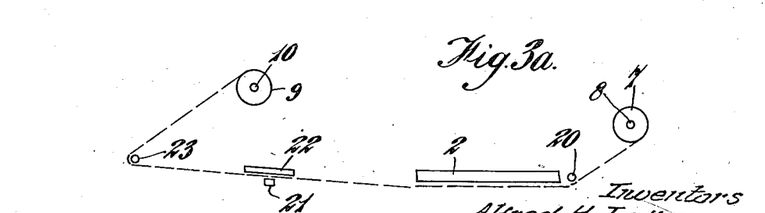
Figure 3a is a diagram corresponding to Figure 3, showing the path taken by the web.

Referring to Figure 1, the body or main frame of the machine is designated by the numeral 1. The platen 2 is pivoted at 3 to the frame and has an extension to which is pivoted the toggle links 4 which are coupled by the connecting rod 5 to the crank 6. Rotation of the crank 6 results in an oscillation of the platen 2 to and from the printing bed 1', in the well known manner, and this method of oscillating the platen leaves a clear passage for a web of paper to be fed across the platen, as is indicated in Figure 3a.

The paper web is taken from the supply roll 7 (Figure 2), which is secured to a spindle 8 and is rolled onto the take-up roll 9 on a spindle 10.

Figure 2:
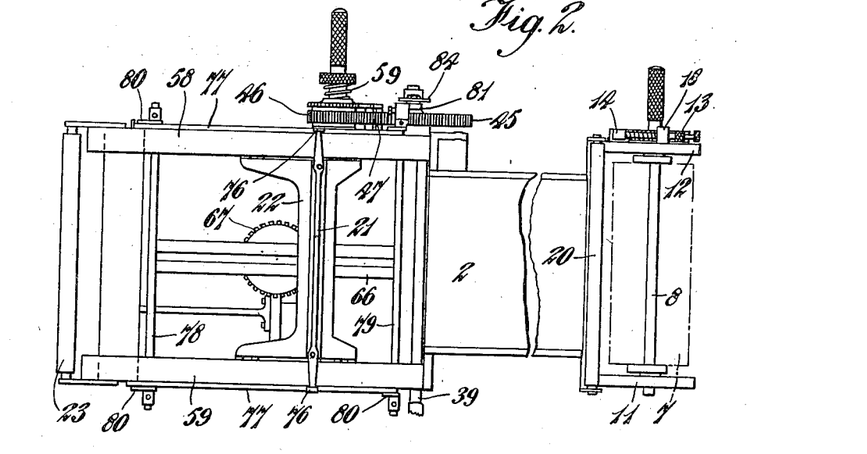
Figure 2 is a view looking on the platen.

The spindle 8 is journalled in brackets 11 and 12 which are secured to one side of the platen 2.

Figures 12, 13, 14:
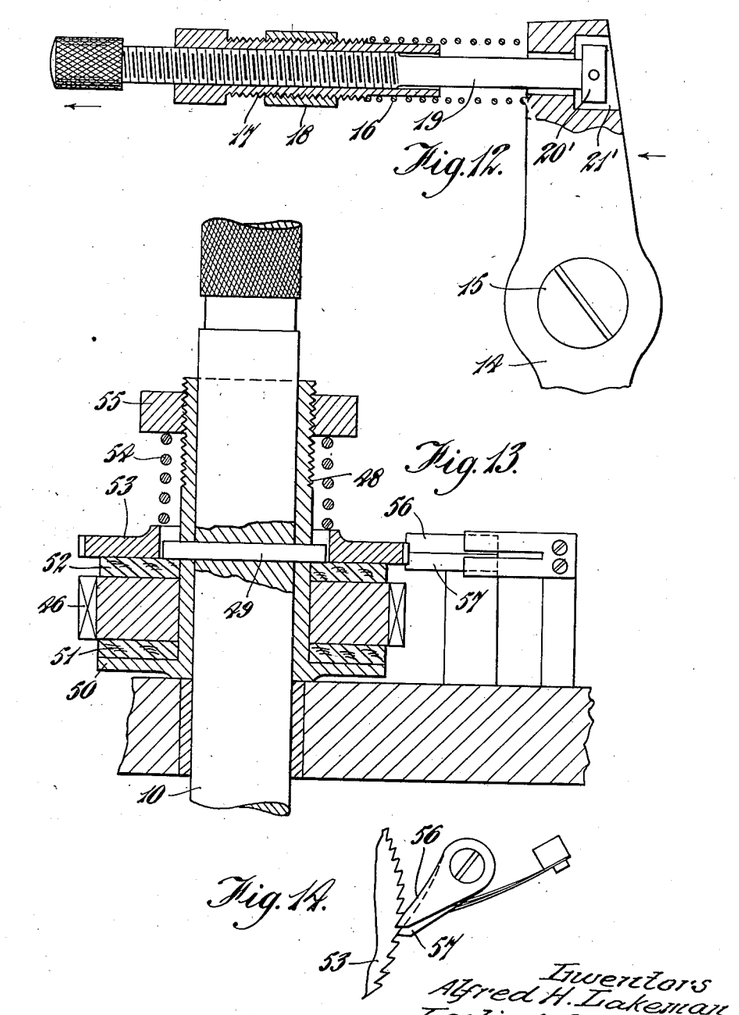
Figure 12 is a sectional plan of a device for applying and disengaging a brake on the paper supply roll.
Figure 13 is a sectional elevation of a part of the driving mechanism of the take-up roll.
Figure 14 is a part plan corresponding thereto.

To prevent over-running of the supply roll, the spindle 8 is provided with a brake disc 13 to co-act with a brake shoe 14 which is pivoted at 15 to the bracket 12. Braking pressure is applied by a spring 16, which butts against the tail end of the shoe and against a shoulder on a hollow screw 17 (Figure 12). The braking pressure can be varied by means of the screw 17 which works in an abutment 18 secured to the bracket 12. In order that the brake-shoe can be lifted away from the disc 13, the screw 17 is internally screw-threaded to receive the screw-threaded part of a draw-rod 19 which has a head 20', which engages in a counter-bore 21' in the shoe. Rotation of the rod 19 in one direction will draw the shoe away from the disc 13 and rotation in the opposite direction will allow re-engagement of the shoe with the disc without disturbing the setting of the spring 16 by means of the screw 17.

The web passes over a freely mounted roller 20 at one side of the platen, between a gripper-bar 21 and abutment 22 and then over a freely mounted roller 23 to the take-up roll 9.

Figures 4, 5, 6, 7:
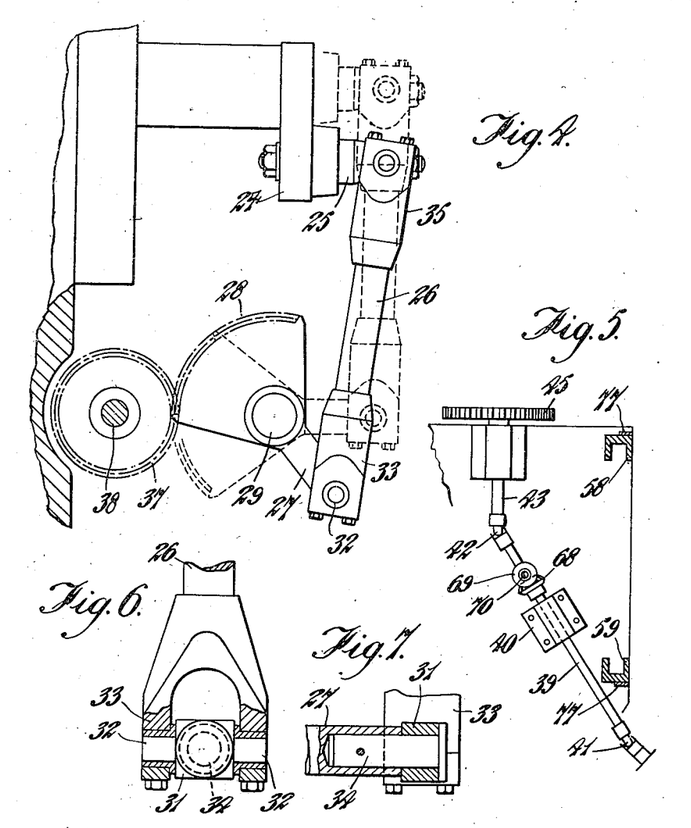
Figures 4 and 5 are side elevations of parts of the driving connection between the body of the press and the web feeding apparatus, with the platen in the closed position in Figure 5.
Figures 6, 7, and 8 being sectional views of details of said driving mechanism.

The take-up roll and the gripper 21, 22 are driven from the shaft 6' of the crank 6, the drive being such that the web is drawn from the roll 7 and taken up on the roll 9 while the platen 2 is swinging outwards. The shaft 6' is provided with a crank arm 24, the crank pin 25 of which is coupled, by a connecting rod 26, to the tail 27 of a gear quadrant 28 which is pivoted at 29 to a bracket 30 which is secured to the frame 1. As the axes 29 and 6' are at right angles to one another, the connecting rod 26 is adapted to constitute a universal joint in order that the rod may move from the position shown by full lines to that shown by chain lines in Figure 4. A block 31 having trunnions 32 (Figures 1, 4, 6, and 7) is pivoted in the lower fork 33 of the connecting rod and receives a pin 34 which is secured in the tail 27 of the quadrant 28. The upper fork 35 is similarly provided with a block 36 in which works the crank pin 25. While the crank pin 25 rotates in one plane, the tail 27 moves in another plane and the connecting rod 26 can pivot on the blocks 31 and 36 to compensate for the changing angularity between the tail 27 and the axis 6'.

The quadrant 28 meshes with a pinion 37 fast on a spindle 38 which is journalled in the bracket 30. The spindle 38 is coupled to a spindle 39, journalled in a bracket 40 on the platen, by means of a universal joint 41, the pivotal or neutral point of which lies on the axis 3 about which the platen 2 can pivot. The spindle 39 is connected by a universal joint 42 to a spindle 43 to which a toothed wheel 45 is secured. The wheel 45 drives a pinion 46 on the take-up spindle 10 through an idle pinion 47.

The length of paper to be fed at each cycle of the machine can be set within the limits of zero to the width of the largest form that the machine will accommodate, and the diameter of the take up roll gradually increases as paper is wound onto it. To compensate for these variable factors, while maintaining a constant angular motion of the wheel 45, the drive between this wheel and the spindle 10 is not positive. Referring more particularly to Figure 13, the pinion 46 is loose on a sleeve 48 which is pinned at 49 to the spindle 10. The sleeve has a flange 50 on which a washer 51 of leather or anti-friction material rests, the pinion being between the washer 51 and a similar washer 52. A ratchet wheel 53 is keyed to the sleeve by means of the pin 49, so that it rotates with the sleeve, but can move axially thereon. These parts are held together to constitute a friction clutch by means of a spring 54, the pressure of which can be set by means of a nut 55 screwed onto the sleeve 48. When the tension of the web exceeds the pressure exerted by the spring, the pinion 46 can turn idly, slipping on the washers 51 and 52. The rotation of the wheel 45 is not uni-directional, and in order that the take up spindle 10 shall rotate intermittently in one direction only, detents 56 and 57 engage with the ratchet wheel 53 to arrest it against rotation in one direction, during which time, the friction clutch permits the idle rotation of the pinion 46. The detent 57, in a well known manner, is longer than that 56 by a length equal to half the pitch of the ratchet teeth (Figure 14), in order that the effect of a finely toothed wheel may be obtained with a coarsely toothed wheel.

The feeding of the web is effected by means of the gripper 21, 22, which is reciprocated in a guide frame, comprising upper and lower channels 58 and 59, secured to the side of the platen 2.

Figures 9, 10, 11:
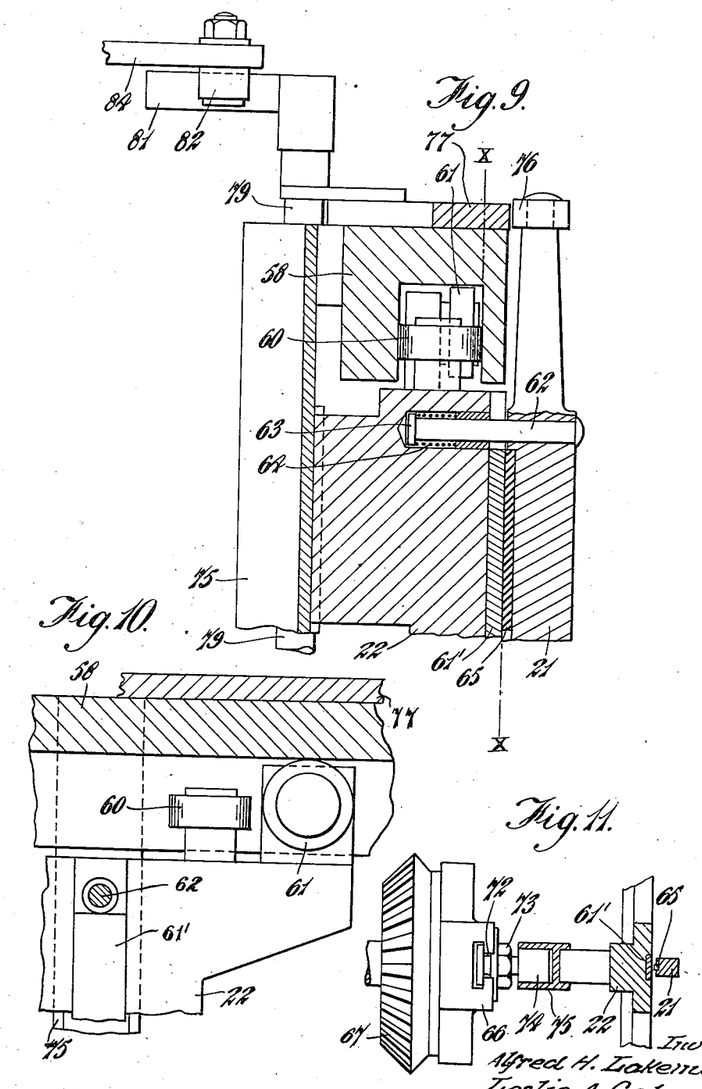
Figures 9 and 10 are, respectively, a side sectional elevation of part of the gripper and a sectional elevation of same seen when looking on the platen.
Figure 11 is a sectional view of a part of the mechanism for reciprocating the gripper.

The abutment 22 is provided with rollers which run in the channels, some of those which run in the upper channel being shown clearly in Figures 9 and 10. Rollers 60 arranged horizontally engage with the sides of the channels while rollers 61 engage with the upper side of channel 58 or the bottom of channel 59. In order that the weight of reciprocatory parts may be a minimum, the abutment is made of aluminium, the actual abutment surface being afforded by a steel insert 61. The gripper-bar 21 is carried by the abutment on pins 62, which have heads 63 entering the abutment and acted upon by springs 64 which tend to close the gripper-bar onto the abutment. The gripping surface of the gripper-bar is afforded by a rubber insert 65.

The abutment is reciprocated by a crank 66, which is carried by a bevel gear 67 driven through gearing from the spindle 39. The spindle 39 has a mitre wheel 68 meshing with a mitre wheel 69 (Figure 5), which is secured to a spindle 70. A mitre wheel 71 is secured to the spindle 70 and meshes with the wheel 67. The crank 66 may be made as shown, double armed to provide a good balance. The crank has a variable throw to vary the stroke of the gripper arrangement, it being infinitely variable from zero to the maximum length of imprint, which can be printed on the machine. The crank (Figure 11) is T-slotted to receive the head of a pin 72, which can be locked in any radial position by a nut 73. A block 74 is freely mounted on the pin and works in a channel 75 which is secured to the abutment 22. A rotation of the crank through 180° will cause the gripper to move the full length of its stroke as determined by the setting of the pin 72.

Means are provided for moving the gripper-bar 21 to and from the abutment 22. When the gripper is at the end of its stroke nearest to the platen, it must close onto the sheet, and while the platen is open, the gripper must move to the end of its feeding stroke thereby feeding the web a determined amount. At this end of the stroke, the gripper-bar must move away from the abutment to release the web, and be held away, in order that the gripper may return without dragging the web. Each end of the gripper-bar is provided with a roller 76, and bars 77 are provided adjacent to the channels 58 and 59 to encounter the rollers and so to move the gripper-bar away from the abutment. Two spindles 78 and 79 are journalled on the channels, and crank arms 80 secured thereto are pivoted to the bars 77 so that a partial rotation of the spindles will effect a slight movement of the bars 77 to or from the gripper bar 21. The spindle 79 is provided at its upper end with a finger 81 which is adapted to be moved in one direction or the other by rollers 82 and 83 on an arm 84 which is secured to the spindle 40 and can, therefore, oscillate with the toothed wheel 45. In Figures 2, 3, and 9, the gripper-bar has been closed by the springs 64 after the contact of roller 82 with finger 81. At the end of the feeding stroke of the gripper, the arm 84 will have rotated sufficiently (in a clockwise direction as viewed in Figure 3) for the roller 83 to strike the finger to cause a partial rotation of the spindle 79 and, therefore, of the connected cranks 80 and spindle 78, so that the bars 77 will move into contact with rollers 77 to lift the gripper bar from the abutment against the action of the springs 64. The cranks 80 are moved to a dead centre position to hold the gripper open during its return stroke and the gripper bar cannot be closed by the springs 64 until the roller 82 strikes the finger 81 to move the cranks off their dead centre positions.

In order that the timing of the opening and closing of the gripper may be adjusted, the rollers 82 and 83 are circumferentially adjustable on the arm 84.

Figure 8:
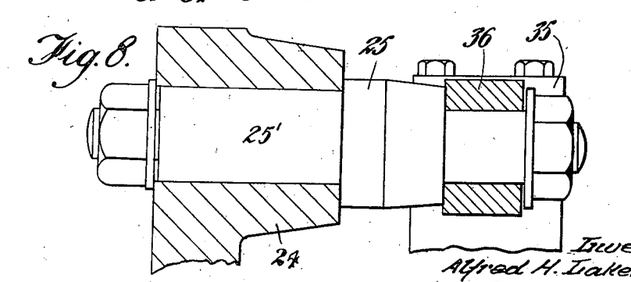

To afford a means for making a slight adjustment of the relationship between the movements of the gripper and take-up roll and those of the platen, the crank pin 25 (Figure 8) has that part 25' which is actually in the crank 24 slightly eccentric to that part which projects from it.

Figure 15:
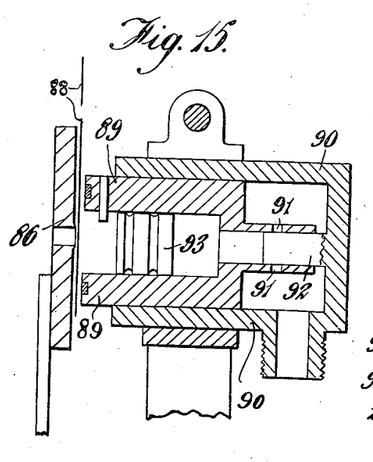
Figure 15 is a sectional elevation of a device for perforating the web.

When several webs are to be assembled together and collated for use in manifolding and like machines, it is frequently desired to perforate the webs at intervals, the perforations in the web being subsequently used to facilitate collation of the webs. A perforating device is indicated at 85 (Fig. 3). The perforator may be pneumatically operated, for example, as is shown in Figure 15, a die plate 86 having a die orifice 87 is provided and the web 88 can be pressed onto it by a cylinder 89 which is acted upon by compressed air which enters the cylinder 90. When the cylinder 89 has moved to its fullest extent, the ports 91 which co-act with a spigot 92 to form a valve will open to admit compressed air to the interior of the cylinder 89 with the result that the piston 93 will be moved, in the cylinder 89, to compress the air between the piston and the web which is held to the die with the result that when sufficient pressure is attained, the paper over the orifice 87 will be blown out to leave a perforation in the web. The nipple on the cylinder 90 may be connected by a flexible pipe to any suitable source of compressed air, for example, the usual reciprocatory compressor with which the press is provided for use with the ordinary suction sheet-feeder, so that the suction stroke of the compressor will withdraw the cylinder 89 and piston 93. The perforator may be adjustable in order that the pitch of the perforations may correspond with the length of the imprint and it may also be adjustable according to the width of the web. This method of perforation has several advantages. There is no wear between a punch and die which must be maintained a good fit to punch a single thickness of paper, the supply of compressed air to the cylinder through a flexible pipe facilitates adjustment of the device, and on machines having an ordinary suction feeding apparatus, the existing pump may be used to supply the compressed air.

Various details may be modified.

Figure 16:
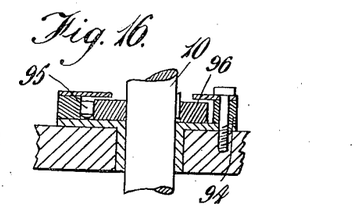
Figures 16 and 17 are, respectively, a side sectional elevation and plan of a friction ratchet for the take-up spindle.
Figure 17:
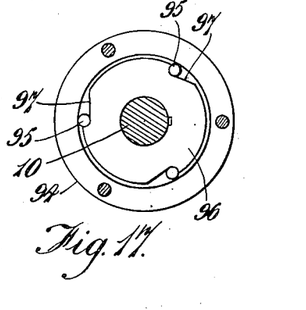

The take-up spindle 10 may be provided with a friction detent in place of the ratchet wheel 53 and pawls 56 and 57. Referring to Figures 16 and 17, a stationary race 94 is provided to co-act with rollers 95 situated between it and a movable race 96 to which the spindle 10 is feathered. The race 96 is provided with ramps 97 between which and the race 94, the rollers can bind upon any attempt to reverse the direction of rotation of the spindle.

An oscillatory gripper may be used in place of the reciprocatory gripper 21, 22. Referring to Figures 20 to 23, the spintle 70 is provided with a mitre wheel 71' which meshes with a mitre wheel 67' secured to a spindle 98 and a disc 99. An abutment cylinder 100 is freely mounted on the spindle and has secured to its lower end a ratchet 101. A pawl 102 on the disc 99 can engage with either of two teeth 103 of the ratchet to impart to the cylinder an intermittent but uni-directional movement, the spindle 70 receiving, as already described, intermittent motion in two directions. A brake 104 prevents any possible reversal of the cylinder. Arms 105 are carried by the spindle 98 and oscillate with it, and carry at their outer ends an eccentrically mounted gripper bar 106. A tappet 107 is secured to the gripper bar and can be moved, under the action of a toggle spring 108, to move the gripper bar to and from the abutment cylinder. The opening and closing of the gripper are effected by adjustable stops 109 and 110, so that the distance through which the gripper can move when closed can be controlled to suit the length of paper to be fed at each operation.

Figure 18:
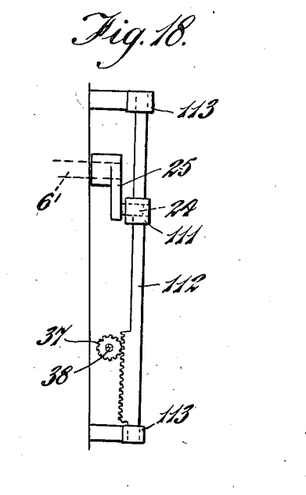
Figures 18 and 19 are two diagrammatic elevations of an alternative driving mechanism.
Figure 19:
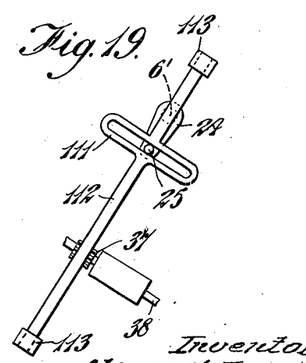
Figure 20:
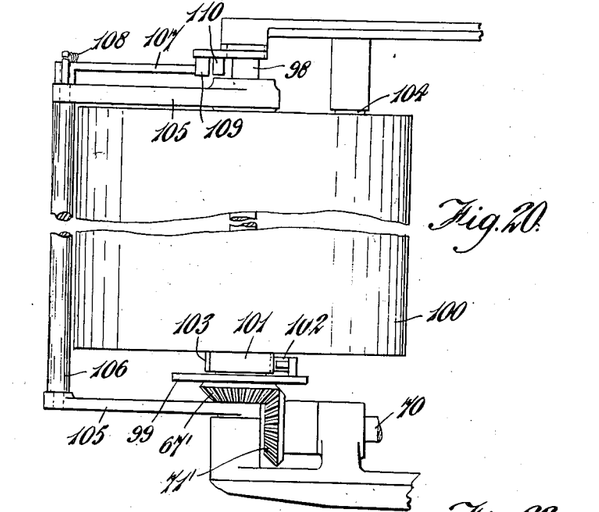
Figures 20 to 23 are diagrammatic illustrations of an alternative form of gripper.
Figures 21, 22, 23:
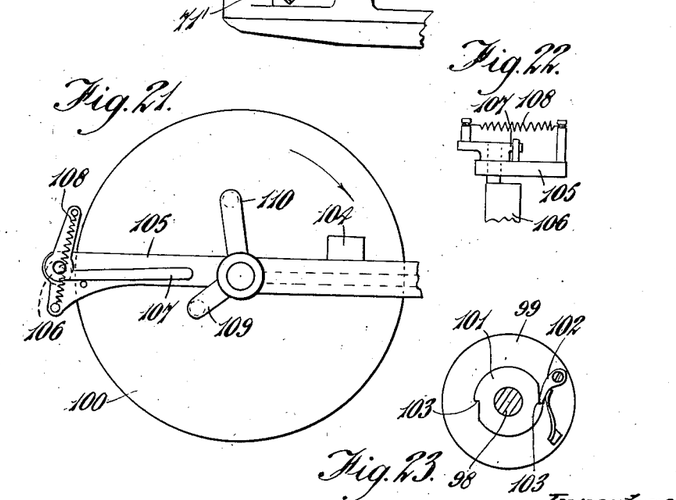

Figures 18 and 19 show an alternative mechanism for transmitting motion from the crank shaft 6' of the press to the spindle 39 of the delivery and feeding apparatus. The crank pin 25 of the crank 24 engages within a slotted link 111 of a rack bar 112 which can work in guides 113 on the body of the press. The rack bar engages with the pinion 37 which is secured to the shaft 38. As the crank pin 25 rotates, it passes along the slotted link 111 and thereby causes a reciprocation of the rack bar and oscillation of the spindle 38, the motion of which is transmitted to the take-up roll and grippers in the manner already described.

The drive from the shaft in the body of the press to the apparatus on the platen may be continuous or uni-directional.

The roller 23 may be carried in spring mounted bearings in order that it may act as a jockey roller to assist in maintaining taut the paper between the gripper and the take-up roll.

We claim:

1. A platen printing press having a platen movable relatively to a fixed printing bed, a rotary support for a roll of paper, a rotary take-up spindle for taking up a web of paper passing from said feed roll across said platen to said spindle, a reciprocatory gripper, said feed roll support, take-up spindle and reciprocatory gripper all being carried by said platen, a continuously rotating driving shaft on said press, and means driven by said shaft for driving said take-up roll and reciprocating said gripper for the purpose of feeding said paper web across said platen intermittently.

2. A platen printing press having a platen oscillating relatively to a fixed printing bed, means carried by said platen for supporting a feed roll of paper and a rotary spindle for taking up the paper web passing from said feed roll across said platen, means for retarding said feed roll, a reciprocatory gripper for periodically engaging with said paper web and drawing it across the platen when said platen is moved off said printing bed, a driving shaft on said press, mechanism carried by the platen for reciprocating said gripper, and for periodically rotating said take-up spindle, and a universal driving connection between said mechanism and said driving shaft.

3. A platen printing press having an oscillatory platen movable relatively to a fixed printing bed, a support for a feed roll of paper, and a rotary spindle, situated adjacent to said platen, said spindle being adapted to take up a paper web from said roll after it has passed across said platen, a reciprocatory gripper comprising an abutment member and a gripper-bar carried by said abutment member, a guide frame for said gripper, means for reciprocating said abutment member in said frame, springs for pressing said gripper bar against said abutment member for the purpose of gripping said paper web between said bar and abutment during movement of the gripper in one direction, and means for withholding said gripper-bar from said abutment to release the paper web during movement of the gripper in the other direction.

4. A platen printing press having a platen which oscillates relatively to a printing bed carried by the fixed frame of the press, a driving shaft on said fixed frame, said platen carrying a support for a paper feed roll, a rotary take-up spindle for a paper web passing from the feed roll to said spindle across the platen, a gripper for feeding said web across the platen, and mechanism for operating said gripper and take-up spindle, and a universal driving connection between said mechanism and said driving shaft.

5. A platen printing press having a platen which oscillates relatively to a printing bed carried by the fixed frame of the press, a driving shaft on said fixed frame, said platen carrying a support for a paper feed roll, a rotary take-up spindle for a paper web passing from the feed roll to said spindle across the platen, a gripper for feeding said web across the platen, and mechanism for operating said gripper and take-up spindle, said operating mechanism including an oscillatory shaft; and means mounted on the fixed frame of the machine and driven by said driving shaft for imparting oscillatory movements to said oscillatory shaft and including a universal driving connection therewith.

6. For use on a platen printing press, apparatus for feeding a web of paper between the platen and type bed and across the press, comprising a gripper for seizing the web to impart a feeding movement thereto, a variable throw-crank adapted to effect the reciprocation of said gripper and to enable the length of said reciprocation to be adjusted to permit of the web being fed in steps of a desired length, means for closing the gripper onto the web prior to the feeding movement, means for opening said gripper at the end of the feeding movement and for enabling the gripper to return in an open condition, and mechanism for driving the gripper and take-up spindle from a moving part of the printing press.

7. A platen printing press for printing a succession of equally spaced imprints on a paper web, comprising a platen movable to and from a stationary type bed, a support for a feed roll of paper, a feeding device for feeding the web intermittently across the face of the platen, and means for receiving the web after a printing operation all carried by said platen, and means for rotating said receiving device, said feeding device comprising a gripper member and an abutment member between which the web is positively gripped, means for imparting an intermittent feeding action to said gripper member and abutment member, and means for closing and opening said gripper and abutment members to grip and release the web in order that the web may be drawn across the platen positively and in steps of definite length.

8. A platen printing press for printing a succession of equally spaced imprints on a paper web, comprising a platen adapted to oscillate to and from a stationary type bed, a support for a feed roll of paper, a feeding device for feeding the web intermittently across the face of the platen, and means for receiving the web after a printing operation all carried by said platen, and means for rotating said receiving device, said feeding device comprising a gripper member and an abutment member between which the web is positively gripped, means for imparting an intermittent feeding action to said gripper member and abutment member, and means for closing and opening said gripper and abutment members to grip and release the web in order that the web may be drawn across the platen positively and in steps of definite length.

9. A platen printing press as defined in claim 8, having a reciprocatory feeding gripper consisting of an abutment carrying a relatively movable gripper bar; and means for imparting a reciprocatory motion to said gripper, said means comprising a crank of variable throw so that a feeding movement of definite length may be imparted to the gripper, the web thereby being drawn positively across the platen in steps of accurate and determined length.

10. A platen printing press as defined in claim 8, having a frame mounted on said platen, a reciprocatory gripper comprising an abutment and a gripper bar adapted to slide in said frame, and a variable throw crank journaled in a bracket on said platen, said crank being adapted to impart a reciprocatory motion to said gripper for the purpose of drawing the web across the platen in steps of definite length.

11. A platen printing press for printing a succession of equally spaced imprints on a web of paper, comprising a platen adapted to oscillate to and from a stationary type bed, a support for a feed roll of paper, a feeding device for feeding the web intermittently across the face of the platen, and means for receiving the web after each printing operation, means for rotating said paper receiving means intermittently, braking means for preventing the overrun of paper from the roll on said feeding roll support and a variable throw crank for imparting a reciprocatory motion to said feeding device in a plane substantially perpendicular to the plane of oscillation of the platen, all carried by said platen, said feeding device comprising an abutment and a gripper device between which the web can be gripped positively in order that it may be fed across the platen.

12. A platen printing press as defined in claim 8, having a continuously rotating shaft in the stationary main frame of the machine and driving means connecting said shaft to the operating mechanism of gripper and web receiving means adapted to convert the continuous movement of the shaft into an intermittent movement of said operating means for the web receiving device and feeding gripper.

13. A platen printing press as defined in claim 11, having a continuously rotating shaft in the stationary main frame of the machine and driving means connecting said shaft to the variable throw crank and to the web receiving device adapted to convert the continuous movement of said shaft into an intermittent movement of the feeding gripper and receiving device.

ALFRED HARRY LAKEMAN.
LESLIE AUGUSTUS GALE.